(12) United States Patent
DeMember et al.

(10) Patent No.: US 10,783,266 B2
(45) Date of Patent: Sep. 22, 2020

(54) SYSTEMS AND METHODS FOR ACCESS CONTROL AND DATA MANAGEMENT

(71) Applicant: Indais Corp., San Francisco, CA (US)

(72) Inventors: Nicole Patrice DeMember, San Francisco, CA (US); Ross A. Buntrock, San Francisco, CA (US); Cullen Dudas, San Francisco, CA (US)

(73) Assignee: Indais Corp., San Francisco, CA (US)

( * ) Notice: Subject to any disclaimer, the term of this patent is extended or adjusted under 35 U.S.C. 154(b) by 67 days.

(21) Appl. No.: 15/947,200

(22) Filed: Apr. 6, 2018

(65) Prior Publication Data

US 2018/0293397 A1    Oct. 11, 2018

Related U.S. Application Data

(60) Provisional application No. 62/482,427, filed on Apr. 6, 2017.

(51) Int. Cl.
*H04L 29/06* (2006.01)
*G06F 21/62* (2013.01)
*G06F 21/60* (2013.01)

(52) U.S. Cl.
CPC ........ *G06F 21/6218* (2013.01); *G06F 21/604* (2013.01); *H04L 63/10* (2013.01); *G06F 2221/2141* (2013.01)

(58) Field of Classification Search
CPC .............. G06F 21/6218; G06F 21/604; G06F 2221/2141; H04L 63/10
See application file for complete search history.

(56) References Cited

U.S. PATENT DOCUMENTS 6,064,656 A    5/2000  Angal et al.
6,202,066 B1   3/2001  Barkley et al.
(Continued)

FOREIGN PATENT DOCUMENTS

WO    2017044926 A1    3/2017

OTHER PUBLICATIONS

International Search Report and Written Opinion for International Application No. PCT/US18/26468 dated Jun. 28, 2018.

*Primary Examiner* — Ghodrat Jamshidi
(74) *Attorney, Agent, or Firm* — Jeffrey Schox (57) ABSTRACT

A system and method includes: ingesting the computing resource ingestion group at a remote access control service by generating a replica computing resource ingestion group, wherein ingesting the computing resource ingestion group includes replicating each of the plurality of computing resources of the computer network to a remote storage of the remote access control service; applying different permissioning indicia to disparate subsets of the plurality of computing resources of the replica computing resource ingestion group; generating permissioning nexus between each of the one or more accessor groups and the disparate subsets of the plurality of computing resources of the replica computing resource ingestion group, wherein generating the one or more permissioning nexus includes applying one of the different permissioning indicia to each of the one or more accessor groups; disabling access to the computing resource ingestion group at the computer network based on generating the permissioning nexus.

16 Claims, 6 Drawing Sheets

(56) References Cited

U.S. PATENT DOCUMENTS

| | | | | |
|---|---|---|---|---|
| 6,425,016 | B1* | 7/2002 | Banavar | G06Q 10/00 715/751 |
| 7,058,978 | B2* | 6/2006 | Feuerstein | G06F 21/55 705/26.35 |
| 7,272,625 | B1* | 9/2007 | Hannel | H04L 63/0218 709/200 |
| 10,142,349 | B1* | 11/2018 | Tomlin | H04L 63/102 |
| 2002/0147929 | A1* | 10/2002 | Rose | G06F 21/335 726/10 |
| 2003/0105816 | A1* | 6/2003 | Goswami | G06Q 10/10 709/204 |
| 2005/0071449 | A1* | 3/2005 | Alex | G06Q 10/10 709/223 |
| 2005/0240986 | A1* | 10/2005 | Yamamoto | H04L 41/0803 726/1 |
| 2008/0320299 | A1* | 12/2008 | Wobber | H04L 9/12 713/156 |
| 2010/0107214 | A1* | 4/2010 | Ganz | G06F 21/128 726/1 |
| 2012/0246695 | A1 | 9/2012 | Cameron | |
| 2013/0110786 | A1* | 5/2013 | Wu | G06F 16/1844 707/654 |
| 2014/0317054 | A1* | 10/2014 | Barton | G06F 11/1451 707/624 |
| 2015/0200943 | A1* | 7/2015 | Pitre | G06F 21/45 726/1 |
| 2016/0381032 | A1* | 12/2016 | Hashmi | H04L 63/102 726/4 |
| 2017/0257379 | A1* | 9/2017 | Weintraub | H04L 63/107 |

\* cited by examiner

Identifying Data Resources S205

Replicating Data Resources S210

Identifying Data Accessor Groups S220

Applying Access Controls S230

Defining Assemblages S240

Receiving Access Request S310

Verifying Accessor Credentials S320

Querying Policy Database S330

Processing Query S340

Providing Query Response S350

FIGURE 3

| On The Fly 1 ○ | CUSTOMER DATA REPORT | | SELECT ALL COLUMNS ⬤ |
|---|---|---|---|
| On The Fly 2 ○ | ✓ | ✓ | |
| 4Q16 Projections ○ | COLUMN_1_NAME | COLUMN_SATISFA... | PACKAGE_TYPE |
| 3Q16 Regression Analy... ○ | $21.01 | 88 | $21.01 |
| Customer Retention An... ○ | $1,268.04 | 67 | $1,268.04 |
| Customer Service Logs ○ | $37,105.02 | 78 | $37,105.02 |
| 4Q16 Viewing Analysis ○ | $17.22 | 49 | $17.22 |
| 3Q16 Viewing Analysis ○ | $332.41 | 87 | $332.41 |
| 2Q16 Viewing Analysis ○ | $12,501.10 | 93 | $12,501.10 |
| 1Q16 Viewing Analysis ○ | $10.11 | 94 | $10.11 |
| 4Q15 Viewing Analysis ○ | $510.07 | 81 | $510.07 |
| 3Q15 Viewing Analysis ○ | AND OR | | ADD RULE   ADD GROUP |
| 2Q15 Viewing Analysis ○ | | | |
| 1Q15 Viewing Analysis ○ | SELECT COLUMN ▼ | | DELETE |

| | |
|---|---|
| Just Me | ✓ |
| All Users | ✓ |
| 4Q16 Projections | ○ |
| 3Q16 Regression Analys... | ✓ |
| Customer Retention Ana... | ✓ |
| Customer Service Logs | ✓ |
| 4Q16 Viewing Analysis | ✓ |
| 3Q16 Viewing Analysis | ○ |
| 2Q16 Viewing Analysis | ○ |
| 1Q16 Viewing Analysis | ○ |
| 4Q15 Viewing Analysis | ○ |
| 3Q15 Viewing Analysis | ✓ |
| 2Q15 Viewing Analysis | ✓ |
| 1Q15 Viewing Analysis | ○ |

FIGURE 6

SYSTEMS AND METHODS FOR ACCESS CONTROL AND DATA MANAGEMENT

CROSS-REFERENCE TO RELATED APPLICATIONS

This application claims the benefit of U.S. Provisional Application No. 62/482,427, filed 6 Apr. 2017, which is incorporated in its entirety by this reference.

TECHNICAL FIELD

The inventions of the present application relate generally to access control and the data management field, and more specifically to new and useful systems and method for controlling access to enterprise data.

BACKGROUND

Many companies and large enterprises generate and acquire increasingly large amounts of data. This enterprise data is often useful for implementing various operations and organizational objectives.

The clear majority of enterprise data management and access control systems require advanced training and a niche skill set relegated to the highly technical personnel. This type of access control management typically leads to various unwanted behaviors and results including: 1) the personnel (e.g., IT personnel or technical resource) responsible for setting data access control distributing too much information and the like through convenient, and often, insecure mediums such as email, network drives, cloud-based storage services (e.g., Dropbox), etc.; or 2) the personnel, conversely, set data access control measures which overly restrict the information flow to different segments and users (e.g., employees) of an enterprise resulting in circumstances in which employees never properly receive all the information needed to effectively perform tasks.

Additionally, enterprise IT departments often define access policies around archaic technology centric models that fail to fully consider the collaborative, cross-team working styles of modern organizations. Many existing access controls are implemented around rigid organizational structures, and access policies implemented around archaic technical concepts, such as organizational charts and digital file systems. These existing access controls, similarly, fail to consider the often fluid and collaborative working groups and systems that operate in modern organizations.

Thus, there is a need in the access control and data management field to create novel systems and methods for controlling access to and managing enterprise data. The inventions herein provide such new and useful systems and methods.

SUMMARY OF THE INVENTION in one embodiment, an online, remote access control system for controlling access to resources of a computer network comprises: a remote access control platform that is implemented by one or more computing servers and that identifies a data ingestion group comprising a plurality of electronic data resources of the computer network; ingests the data ingestion group at the online, remote access control system by generating a replica data ingestion group, wherein ingesting the data ingestion group includes replicating each of the plurality of electronic data resources of the computer network to a remote storage of the online, remote access control system; implements an access control module that: applies different permissioning indicia to disparate subsets of the electronic data resources of the replica data ingestion group; defines one or more accessor groups comprising one or more users of the computer network; generates one or more permissioning nexus between each of the one or more accessor groups and one or more of the disparate subsets of the electronic data resources of the replica data ingestion group, wherein generating the one or more permissioning nexus includes applying one of the different permissioning indicia to each of the one or more accessor groups based on access control policy associated with the computer network; disables access to the data ingestion group at the computer network based on generating the one or more permissioning nexus; and enables access to the replica data ingestion group at the online, remote access control system based on generating the one or more permission nexus.

In one embodiment, in response to disabling access to the data ingestion group at the computer network, automatically routing one or more access requests for the electronic data resources of the data ingestion group to the remote access control service; and allowing or disallowing the one or more access requests for accessing replicas of the electronic data resources by the remote access control service based on the one or more permissioning nexus.

In one embodiment, the online access control system further comprising: an access control policy engine that regulates access to the replica data ingestion group at the online, remote access control system, wherein the access control policy engine evaluates access requests from user of the computer network for the electronic data resources of the replica data ingestion group based on access control policy associated with the replica data ingestion group at the online, remote access control system.

In one embodiment, the access control module further: sets an access control scheme comprising a color-coded access control policy, wherein the different permission indicia comprises a plurality of different color markers, wherein setting the permissioning nexus between each of the one or more accessor groups and the one or more of the disparate subsets of the electronic data resources of the replica data ingestion group includes assigning a same color marker of the plurality of different color markers that was previously applied to a subset of the replica data ingestion group to a respective accessor group.

In one embodiment, an online method for controlling access to electronic data resources of a computer network comprises identifying a data ingestion group comprising a plurality of electronic data resources of the computer network; ingesting the data ingestion group at a web-based access control service by generating a replica data ingestion group, wherein ingesting the data ingestion group includes replicating each of the plurality of electronic data resources of the computer network to a remote storage of the web-based access control service; applying different permissioning indicia to disparate subsets of the electronic data resources of the replica data ingestion group; defining one or more accessor groups comprising one or more users of the computer network; generating one or more permissioning nexus between each of the one or more accessor groups and one or more of the disparate subsets of the electronic data resources of the replica data ingestion group, wherein generating the one or more permissioning nexus includes applying one of the different permissioning indicia to each of the one or more accessor groups based on updated access control policy associated with the computer network; disabling access to the data ingestion group at the computer network based on generating the one or more permissioning nexus; and enabling access to the replica data ingestion group at the web-based access control service based on generating the one or more permission nexus.

In one embodiment, the data ingestion group is maintained at one or more storage locations of the computer network, and the replica data ingestion group is maintained at the remote storage of the remote access control service.

In one embodiment, in response to disabling access to the data ingestion group at the computer network, automatically routing one or more access requests for the electronic data resources of the data ingestion group to the remote access control service; and allowing or disallowing the one or more access requests for accessing replicas of the electronic data resources by the remote access control service based on the one or more permissioning nexus.

In one embodiment, selecting an access control scheme comprising a color-coded access control policy, wherein the different permission indicia comprises a plurality of different color markers, wherein setting the permissioning nexus between each of the one or more accessor groups and the one or more of the disparate subsets of the electronic data resources of the replica data ingestion group includes assigning a same color marker of the plurality of different color markers that was previously applied to a subset of the replica data ingestion group to a respective accessor group.

In one embodiment, the method provides a web-based access control interface that enables provisioning the electronic data resources of the replica data ingestion group at the remote access control service to the defined one or more accessor groups associated with the computer network, wherein the web-based user interface displays a population of a plurality of users of the computer network and the disparate subsets of the electronic data resources of the replica data ingestion group.

In one embodiment, the method includes generating a virtual representation of each of the electronic data resources of the replica data ingestion group; and providing the virtual representation of each of the electronic data resources via the web-based user interface.

In one embodiment, applying different permissioning indicia to disparate subsets of the electronic data resources of the replica data ingestion group includes: providing, via the web-based access control interface, a virtual representation of each of the disparate subsets of the electronic data resources, wherein the virtual representations comprises a plurality of different graphical interface objects; providing, via the web-based access control interface, a virtual representation of each of the different permissioning indicia; enabling an administrator of the web-based access control interface to associate each of the disparate subsets of the electronic data resources with at least one of the different permissioning indicia by selectively moving one or more of the virtual representations of different permissioning indicia to an area of the virtual representations of the disparate subsets of the electronic data resources.

In one embodiment, applying different permissioning indicia to disparate subsets of the electronic data resources of the replica data ingestion group modifies an appearance of graphical interface objects corresponding to the disparate subsets of the electronic data resources.

In one embodiment, applying different permissioning indicia to disparate subsets of the electronic data resources of the replica data ingestion group automatically encodes the disparate subsets of electronic data resources with permissioning code that electronically links disparate subsets of electronic data resources to other subsets of electronic data resources assigned with a same permissioning indicia.

In one embodiment, the method includes during a provisioning period comprising a period defined by the generation of the one or more permissioning nexus, access requests received from users of the computer network are evaluated according to a first access control policy comprising a pre-existing access control policy of the computer network; and automatically evaluating access requests received from users of the computer network according to according to the updated access control policy after the provisioning period is complete.

In one embodiment, an online method for controlling access to computing resources of a computer network, the online method comprises identifying a computing resource ingestion group comprising a plurality of computing resources of the computer network; ingesting the computing resource ingestion group at a remote access control service by generating a replica computing resource ingestion group, wherein ingesting the computing resource ingestion group includes replicating each of the plurality of computing resources of the computer network to a remote storage of the remote access control service; applying different permissioning indicia to disparate subsets of the plurality of computing resources of the replica computing resource ingestion group; defining one or more accessor groups comprising one or more users of the computer network; generating one or more permissioning nexus between each of the one or more accessor groups and one or more of the disparate subsets of the plurality of computing resources of the replica computing resource ingestion group, wherein generating the one or more permissioning nexus includes applying one of the different permissioning indicia to each of the one or more accessor groups based on updated access control policy for the remote access control service; disabling access to the computing resource ingestion group at the computer network based on generating the one or more permissioning nexus; and enabling access to the replica computing resource ingestion group at the remote access control service based on generating the one or more permission nexus.

In one embodiment, in response to disabling access to the computing resource ingestion group at the computer network, automatically routing one or more access requests for the computing resources of the computing resources ingestion group to the remote access control service; and allowing or disallowing the one or more access requests for accessing replicas of the plurality of computing resources by the remote access control service based on the one or more permissioning nexus.

In one embodiment, the method includes selecting an access control scheme comprising a color-coded access control policy, wherein the different, wherein setting the permissioning nexus between each of the one or more accessor groups and the one or more of the disparate subsets of the computing resources of the replica data ingestion group includes assigning a same color marker of the plurality of different color markers that was previously applied to a subset of the replica computing resources ingestion group to a respective accessor group.

In one embodiment, the method further includes providing a web-based access control interface that enables provisioning the computing resources of the replica data ingestion group at the remote access control service to the defined one or more accessor groups associated with the computer network, wherein the web-based user interface displays a population of a plurality of users of the computer network and the disparate subsets of the computing resources of the replica data ingestion group.

In one embodiment, the method includes generating a virtual representation of each of the computing resources of the replica data ingestion group; and providing the virtual representation of each of the computing resources via the web-based user interface.

In one embodiment, applying different permissioning indicia to disparate subsets of the computing resources of the replica data ingestion group includes: providing, via the web-based access control interface, a virtual representation of each of the disparate subsets of the computing resources, wherein the virtual representations comprises a plurality of different graphical interface objects; providing, via the web-based access control interface, a virtual representation of each of the different permissioning indicia; enabling an administrator of the web-based access control interface to associate each of the disparate subsets of the computing resources with at least one of the different permissioning indicia by selectively moving one or more of the virtual representations of different permissioning indicia to an area of the virtual representations of the disparate subsets of the computing resources.

DESCRIPTION OF THE PREFERRED EMBODIMENTS

The following description of the preferred embodiments of the invention is not intended to limit the invention to these preferred embodiments, but rather to enable any person skilled in the art of computer and data security to make and use this invention.

Overview

A presupposition regarding several of the embodiments of the present application is that when empowered with the right quality and quantity of information, organizational employees, including both employees and executives, perform better. A virtuous cycle exists between the effectiveness of employees and the broader release of data to an organization. Thus, embodiments of the present application allow a layman executive or administrator with limited or no technical training to easily understand and personally perform steps to share information and thus, improving the likelihood that the executive or the like will use the invention to share organizational data and information thereby improving the technical field of computer resource and data access control across a network. Further, embodiments of the present application, enable non-technical resources (e.g., executives and the like) to easily audit the access of data within an organization utilizing a comprehensible grok interface and thus, non-technical resources, independent of intervention from an organization's information technology resources, can meaningfully interact with the interface to provision to others and manage data resources within an organization thereby, bolstering their trust and reliance on the system.

The embodiments of the present application provide solutions developed under the guise of democratizing the complex and domain specific knowledge previously required for data management and analytics. Thus, the following description of the embodiments of the present application detail the technical aspects of the technology that enables some of these initiatives and long-term initiatives to rethink and redesign the technology space of access control and data management through the novel interface inventions joined to the fields of machine learning and neural network-based intelligence.

1. System for Access Control and Data Management

Figure 1:
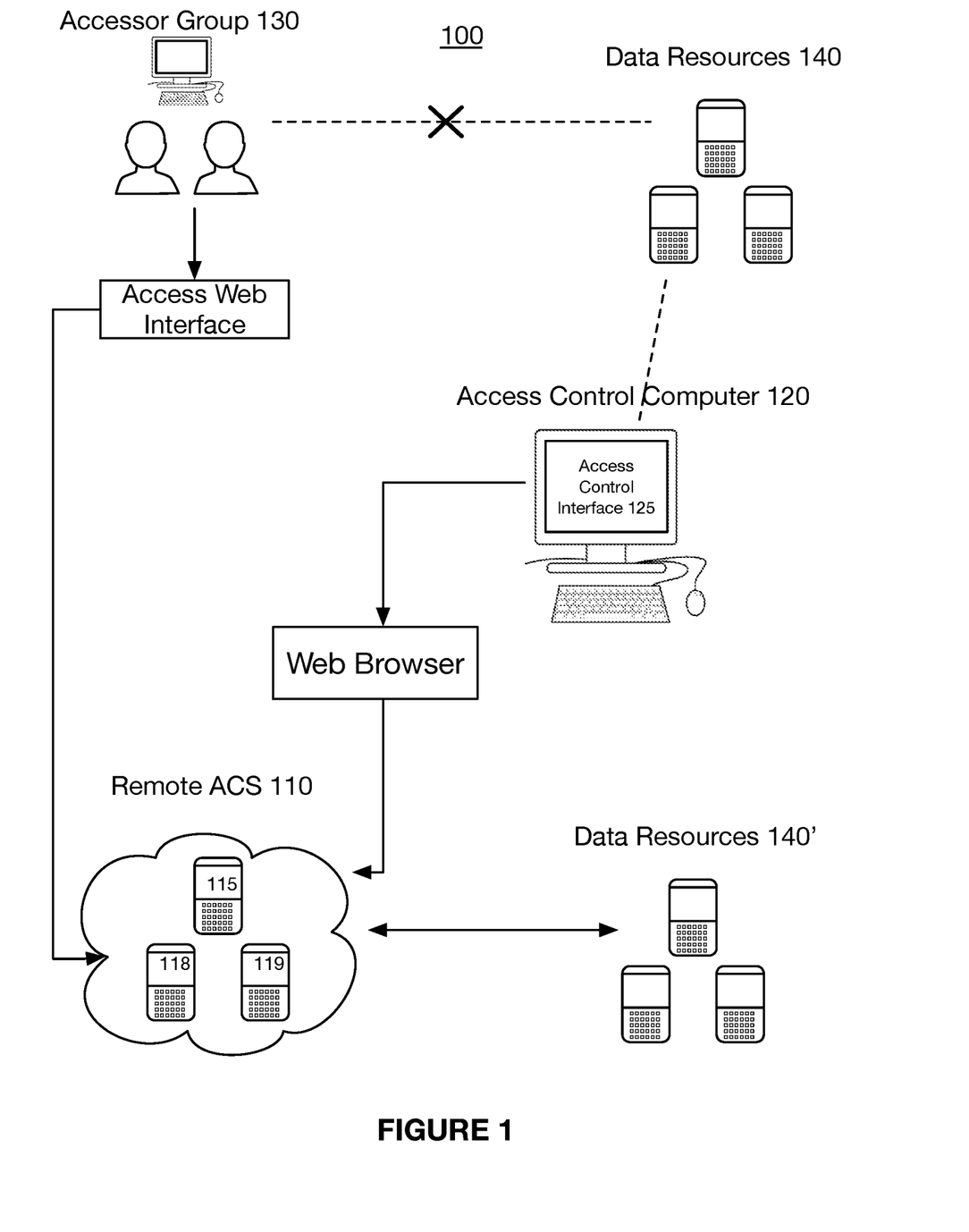
FIG. 1 illustrates a schematic representation of a system of a preferred embodiment of the invention.

As shown in FIG. 1, a system 100 for web-based access control and data management for an organization is provided. The system 100 includes a remote data access control service (or platform) 110, an access control policy engine 118, an access control policy database 119, an access control configuration computer 120, a plurality of computing resources and/or users (e.g., accessor group) 130, entity data resources 140, and replicated entity data resources 140'.

The system 100 functions to enable a web-based access control and data management of data resources 140 of an organizational entity or the like. Specifically, the system 100 may be plugged into and/or connected to an existing network of an organizational entity to provide a web-based platform for provisioning access (e.g., permissions) to data across a plurality of computing devices, applications, and/or users associated with the organizational entity. Thus, the system 100 functions to enable defined access control techniques and policy to regulate data resources that are accessible to users (e.g., user identifiers) and/or computing resources within an organizational entity and similar entities.

The defined access control instructions and policy preferably focuses on provisioning data resources to personnel and/or device groups within the organizational entity using intuitive access control policies and interfaces. For instance, in some embodiments of the present application, access control policy is implemented using color coding (e.g., color access control policy) to mark data resources for granting permissions to one or more predefined groups within the organizational entity.

The remote data access control service 110 may be a third-party service provider that is capable of assimilating into any existing (computer) network or entity data infrastructure for purposes of implementing coded data access control and data management schemes to databases (e.g., relational or non-relational), structured, and/or unstructured data existing in an entity's data infrastructure. Additionally, or alternatively, the remote data access control platform 110 may be a remote server configured to implement, via a network, the coded data access control and data management schemes.

The remote data access control service 110 is preferably hosted in a network accessible cloud-based system (e.g., multiple remote, networked hardware computing servers) or distributed computing infrastructure. It shall be noted that the data access control service or platform may be implemented in any manner suitable for performing data access control and management including implementing the service on-premises of an organization such that the service is not entirely remote but may be partially implemented using the computing resources (e.g., computer processing and storage) of an organizational entity.

The remote data access control service 110 preferably includes an access control module 115 that enables the configuration and setting of access control instructions and data management schemes by an entity (e.g., administrator, IT personnel, etc.) associated with or within an organization. In some instances, the remote data access control service 110 is able to automatically configure and set access control and data management schemes via the access control module 115 without human intervention. For instance, the access control module 115 may be in operable communication with a machine learning engine that functions to gather a range of inputs including historical inputs relating to a prior use of the access control module by one or more human operators. Accordingly, in such instance, through the use of the machine learning engine or in some instances, algorithmically-defined heuristics, the access control module 115 may automatically define configure and set access control and data management parameters for a system. Additionally, the access control module 115 functions to provide a suite of access control tools for configuring access controls and permissions to data resources of an organizational entity. The access control module 115 may be in operable communication with and/or capable of generating an access control web browser that is useable by the entity to configure access controls and data management schemes.

As mentioned above, the control module 115 preferably functions to implement and/or interact with a web browser accessible to the access control configuration computer 120. Accordingly, in some embodiments, a majority of user activity, processes are implemented via one or more user access interfaces of the remote data access control service 110 provided via a web browser. The one or more access interfaces provided to the users of an organizational entity may be different than the access control interface that is used for provisioning data resources of the organizational entity.

The access control policy engine 118 of a preferred embodiment functions to regulate access to data resources (e.g., replicated data resources, on-premises data resources, etc.) in accordance with set access control and data management policies. The access control policy engine 118 is tasked with evaluating access requests and attempts to access data resources in the context of defined access control policy and determining whether or not the computing resource and/or user is permissioned to access and/or use the targeted data resource based on a result of the evaluation performed at the policy engine 118. In the evaluation processes of the access control policy engine 118, the policy engine 118 may be configured (e.g., programmed, etc.) to evaluate computing resource identifiers (e.g., application identifiers, computing terminal identifiers, etc.) and user identifiers (e.g., user credentials, such as username and password, etc.) to determine whether or not there is an active permissioning nexus between the identifiers and the targeted data resources. For instance, the policy engine 118 may capture or receive user credentials during an attempt to access a data resource by a user and evaluate the user credentials together with an identifier for the data resource. In such evaluation, the policy engine 118 may send a query request to a policy database 119, which includes permissioning tables, permissioning maps, and other permissioning data that indicate existing permissions to users and computing resources of an entity. Based on the results of the query to the policy database, if the policy engine 118 determines that the user credentials and the identifier for the data resource are mapped to each other or otherwise, have a permissioning nexus (e.g., a link, an association, connection, etc. between a user or accessor and a data resource indicating permission to access) between them, the policy engine 118 may be configured to permit the access transaction between the user and data resources. If the policy engine 118 determines otherwise, then the policy engine 118 may cancel or block the user's attempt to access the data resource.

The access control policy engine 118 preferably includes or has a communication channel to an access control policy database 119. The access control policy database 119 may be configured to store access control policy information including permissioning data identifying any set permissioning configurations between computing resources and/or users and data resources. The access control policy engine 118 is preferably integrated with the remote data access control service 110, but may alternatively be integrated with and located locally on a computing device of a user, server of the organization, or the like.

The access control configuration computer 120 enables the generation of an access control interface 125 preferably comprising a web interface (e.g., access control interface) for controlling access and implementing data management schemes against the data resources of an organizational entity. Via the web interface, the access control configuration computer 120 is configured to receive access control and data management instructions and/or other input from an administrator or the like for setting access control policy as well as configuring the data resources in any suitable manner. The access control configuration computer 120 may transmit via a network connection (e.g., Internet, LAN, WAN, etc.) to the data access control service 110 the received access control and data management instructions for processing. The received access control and data management instructions may be used by the data access control service no to configure permissions and access policy for the replicated data resources 140'.

Figure 4:
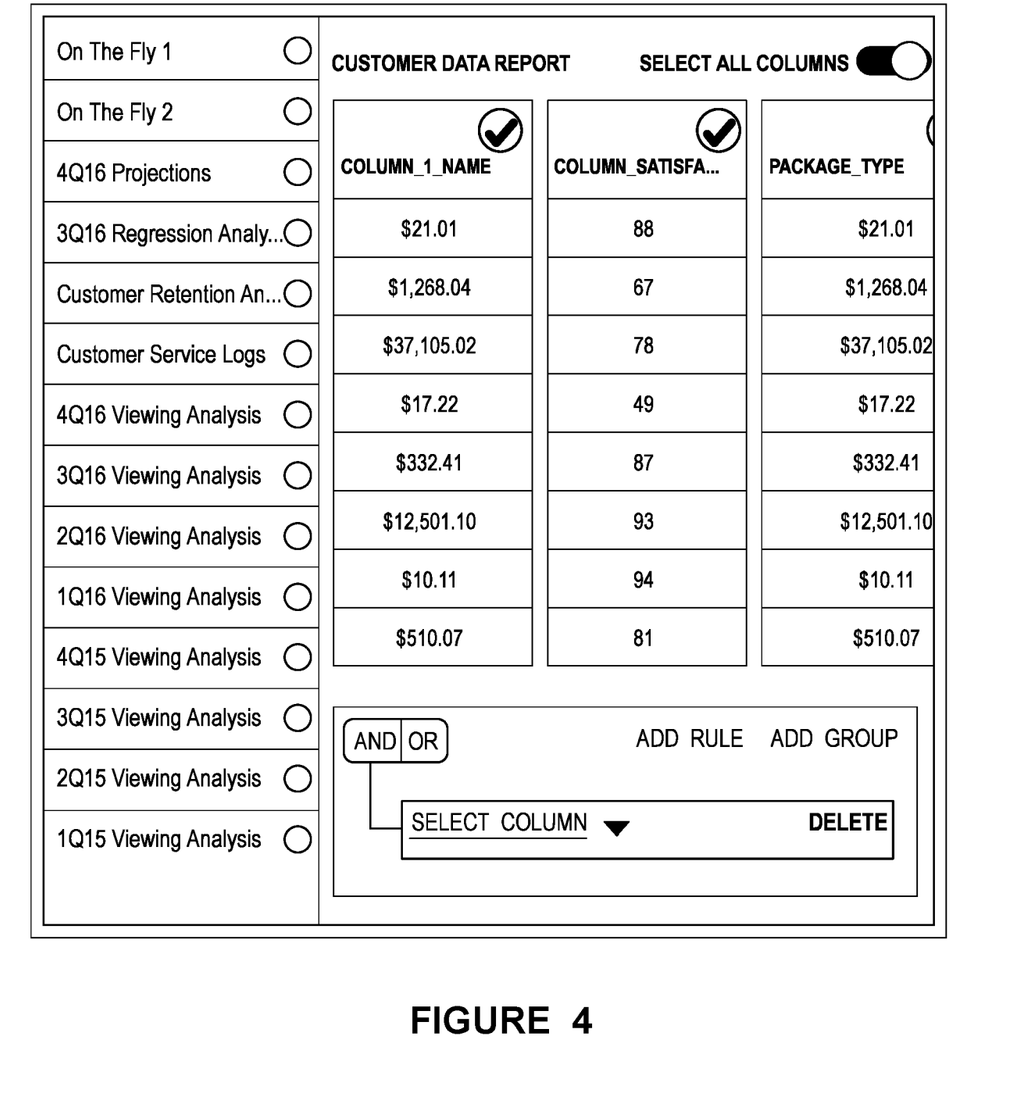
FIG. 4 illustrates an example graphical user interface in accordance with one or more embodiments of the present application.
Figure 5:
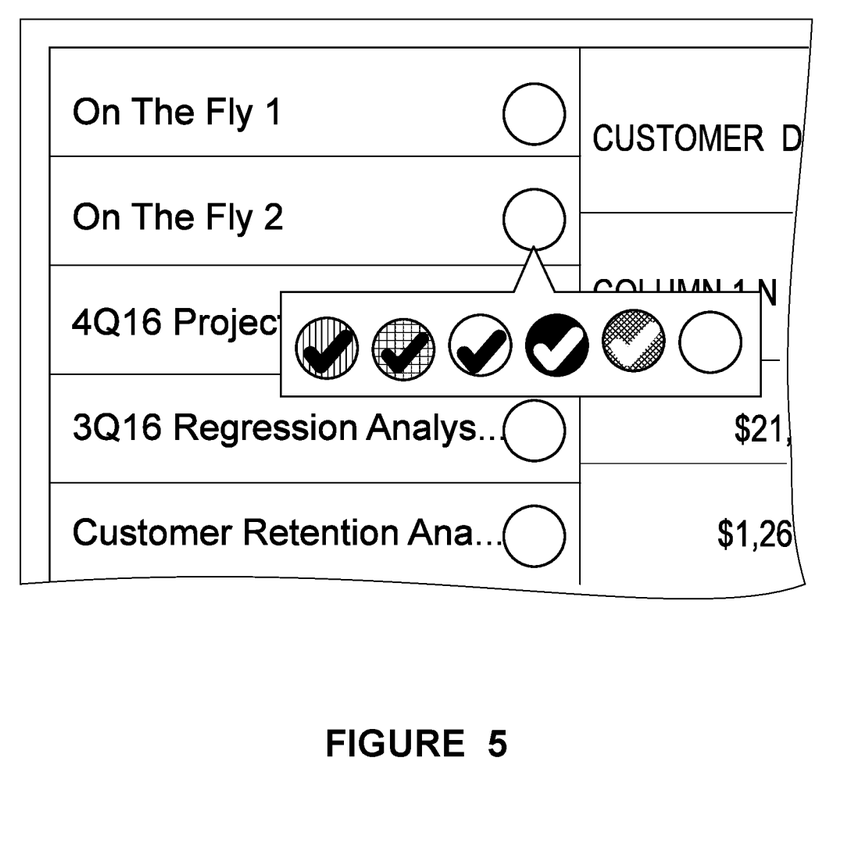
FIG. 5 illustrates a segment view the example graphical user interface in accordance with one or more embodiments of the present application.

The access control interface 125 of a preferred embodiment functions to define access control and data management parameters. The access control interface 125 is implemented via the access control module of the data access remote service 115. FIG. 4 illustrates an example access control interface in which available projects (e.g., accessor groups, labeled user and/or computing resources groups, etc.) of an organization are populated to a column along the left side of the interface. The column including the listed projects may be scrollable upward or downward to display additional projects. The projects can include any number of users (e.g., employees) and/or computing resources (e.g., computers, applications, etc.) associated with an organization. The other columns of the example access control interface of FIG. 4 include data columns having information that may be selectively provisioned to accessor groups by associating with the accessor groups the permissioning indicia (e.g., the blue color code) of the data columns. The data columns may be scrollable to from side-to-side to view additional data columns and their associated permissioning indicia. Additionally, the data previewed in the columns may either be random or sequential. For instance, a column might preview five or eight items, but the data listed may be defined by accessing the full range of data in the column, and presenting a full preview of the content and not merely a list of items (e.g., one to eight). Regarding FIG. 5, FIG. 5 illustrates a segment of the access control interface of FIG.

4 and demonstrates that an administrator or authorized person may be able to select a project/accessor group from the list that they desire to grant access to a particular database that they are provisioning. The administrator may select a color code or color group that they desire to apply to the particular project, thus granting members of that project access to the associated database assigned with the same color permissioning indicia.

The access control interface 125 may be a software module designed to allow an administrator or appropriately designated user to define access control and data management parameters around the use and availability of data resources of an organizational entity by users and/or user devices within the entity. Preferably, the access control interface 125 comprises a web application (i.e., a client application of the remote access control servers) that an administrator or the like may interact with using a web browser to create, read, update, or delete policies and/or configurations for the data resources of the organizational entity. The access control interface 125 may alternatively be an application programming interface (API) for programmatic setting of access control policies and configurations. Additionally, the system 100 may have access control policies preset or set in an alternative way and may not include an access control interface 125. For example, using the access control interface, an authorized user may define access control policy for several collaborative groups of employees within an organization, which allows the members of the collaborative groups to access several organizational databases having confidential business information or the like.

The plurality of computing resources and/or users 130 may include employees, contractors, consultants, applications, scripts, computers, mobile devices, routers, and typically anyone or any device that has access to and/or can be used to process data resources of an organizational entity.

The entity data resources 140 may include any element or component, which may be part of the information technology infrastructure of an entity. The entity data resources 140 may encompass all the data available to an entity. In most circumstances, data resources include electronic data from any source, system-derived (generated) data, and/or automated data. Data resources may additionally include non-automated data, such as paper documents and files, which may be accessible using or only through an electronic device or the like (e.g., electronically accessible physical storage container and thus, access controls may be applied thereto, etc.) that may be controlled via the system 100. The data resources 140 may be online or offline (e.g., not connected to a network). The data resources 140 may additionally include remote data storage services (e.g., Dropbox, Google drive, etc.) and also, cloud service providers that provide one or more services (e.g., e-mail, etc.) to an organization and that generate data and the like.

The replicated entity data resources 140' may be an exact copy or replica of each of the data resources 140 of an entity. Replicated entity data resources 140 may include all data resources of an entity or a subset of the entity data resources. The extent and/or amount of the replicated data resources may be determined during a data ingestion process of the entity data resources to one or more storage mediums of the remote data access control service. An administrator of an organizational entity or the like may be able to selectively identify which of the original entity data resources 140 that should be replicated by the data access control service no into replicated data resources 140'.

Additionally, or alternatively, replicated entity data resources 140' may also or only include metadata of the data resources 140 of an entity. Thus, in some embodiments, rather than generating a copy (or importing all data resources 140) of data resources 140, the system 100 is capable of extracting or identifying metadata associated with some or all of the data resources 140 so that the system 100 does not host the data resources 140 or a copy thereof, but only a representation of the target data resources. In use, the system 100 may use the metadata to call the original data resources 140 when it is needed or being used by an accessor group or the like.

2. Method for Web-Based Access Control and Data Management

Figure 2:
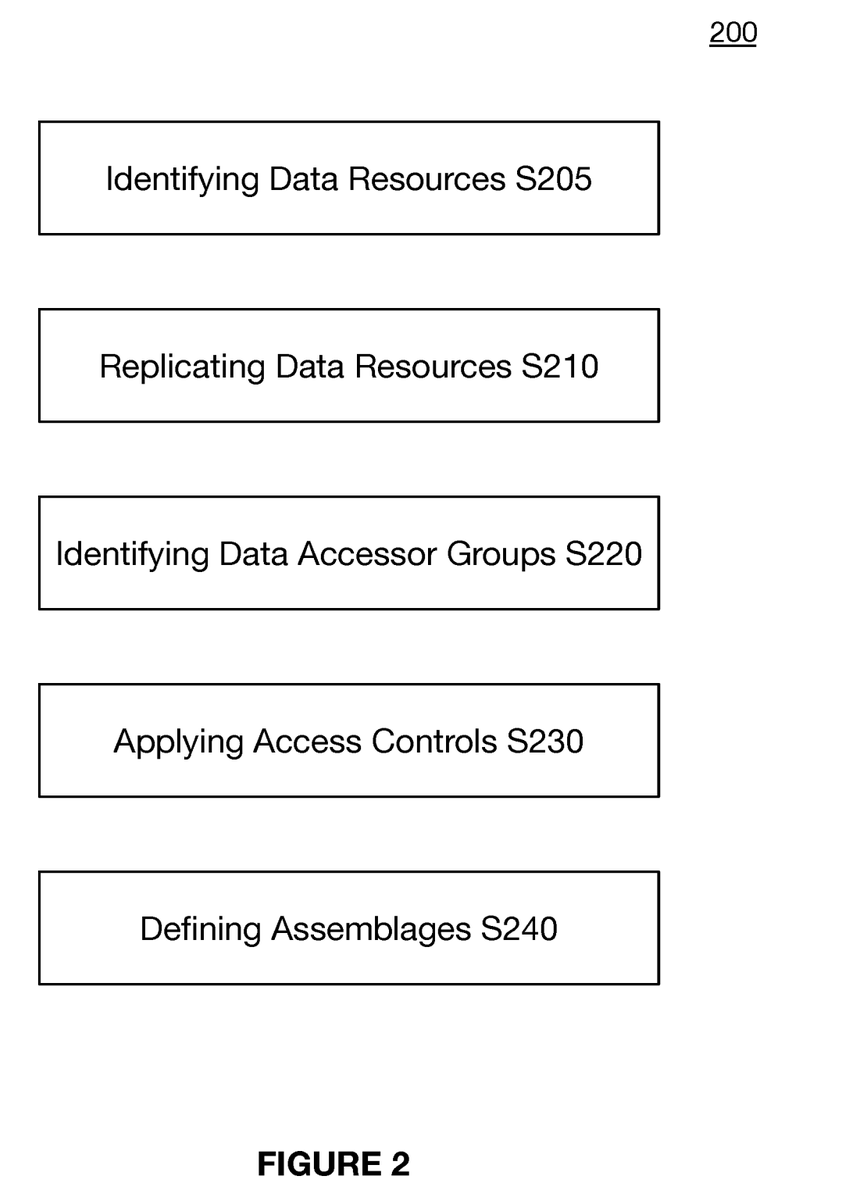
FIG. 2 illustrates a process flow of a method in accordance with one or more embodiments of the present application.

As shown in FIG. 2, a method 200 of a preferred embodiment of the present application may include optionally, identifying one or more data resources and/or computing resources associated with an organizational entity S205, optionally, replicating the identified one or more data sources and/or computing resources to a remote storage S210, identifying one or more users and/or user devices (and/or applications) of the organizational entity into groupings S220, applying one or more access control schemes to the one or more data sources and/or sources of the remote storage S230, and defining an assemblage based on associating at least one of the groupings with the one or more data sources and/or sources having the access control schemes applied thereto S240.

The method 200 enables efficient distribution of permissions and setting of access control policy using an intuitive interface and visual indicia (e.g., permissioning indicia).

Step S205, which includes optionally identifying one or more data sources and/or sources associated with an entity, functions to allow for targeted selection of data sources (e.g., databases, data files, cloud storage services, etc.) for one or more purposes including to be ingested by a remote data access control service or the like. In some embodiments, a remote data access control service is capable of ingesting many or all data sources associated with an organizational entity. In such embodiments, the remote data access control service virtualizes, via a user interface or the like, each of the data sources such that each data source is represented as a graphical interface object (e.g., an icon, animation, etc.) displayed on the UI. This allows a user and the like to easily select and manipulate (e.g., change storage location, copy, transmit, etc.) the objects representing the data sources. DATA INGESTION GROUP . . . REPLICATE SERIALLY OR IN PARALLEL. Rerouting access request to the computer network to the remote access control service Step S210 involves replicating the selected or identified data sources to a remote storage medium. In a preferred embodiment, data associated with the identified/selected data sources or the identified/selected data sources, themselves, may be replicated by a remote data access control service to a remote storage medium associated with the service. That is, the remote data access control service copies each of the identified data sources and hosts the copies in a storage associated with the service while keeping intact or maintaining the existing data sources in their current state (e.g., hosted by or in association with the organizational entity). In some instances, as a result of the replication of the data sources of the organizational entity, the remote data access control service may disable or terminate the capability of the organizational entity's users, user devices, applications, and the like to access and/or use the existing data sources of the entity. In this way, data access control and management of organizational entity's data sources (albeit replicas) is controlled via the remote data access control service (e.g., via a web interface or the like). Specifically, once the replication of the data resources of the organizational entity is complete, this may trigger the data access control service to send a request to disable or otherwise, disable a network connection (e.g., Internet, LAN, or WAN) (LAN) between existing users and/or computing resources of the organizational entity from the existing/original data resources of the entity. Additionally, or alternatively, once the replication of the data resources is complete, this may trigger a signal from the remote service to the computer network or the like to disable on-device access to one or more computing resources thereon. Thus, in such instances, access to organizational data resources may only be accomplished via an interface (e.g., an online web interface) of the data access control service. Additionally, or alternatively, the completion of the replication of the data resources may trigger a predetermined timer (e.g., 24-hour timer or the like) that delays the disablement of the connection for a set period of time. Once the predetermined timer expires, the ability to access the data or computing resource hosted on or accessible through the computer network of an entity is automatically disabled or terminated. This may additionally include computing resources hosted on user devices associated with the computer network.

Step S220 includes, generating groupings of users, devices, applications, various work resources (e.g., virtual workspaces), and the like of the organizational entity. A virtual workspace may be any digital interface through which provisioned/permissioned data resources may be accessed by a correspondingly permissioned accessor group. Additionally, via the virtual workspace, additional analysis and/or analytics tools may be provided. Thus, a virtual workspace may provide an interface in which a user can interact and visualize data (e.g., generate data visualizations), interact with analysis and machine learning models and tools, and the like. The analysis and/or analytics tools may be capable of processing one or more aspects of the data resources accessible via the virtual workspace and generate models and other graphical representations of the data and/or analysis of the data. In some instances, the virtual workspace may be the only medium through which access to provisioned data resources may be accessed by a permissioned accessor group. The identified or generated accessor groupings may typically define a working group of the organizational entity having one or more work goals for achieving one or more objectives of the entity. The groupings may be defined in any manner and may include any combination of organization resources (e.g., human resources) and tools (e.g., devices and applications) for performing work. For instance, a grouping may be defined solely as including several employees of the organization. In another instance, a grouping may be defined with solely devices and applications of the organization without any specific human resource for performing tasks or work (e.g., the applications and devices may be programmed to perform all tasks or work).

Additionally, the groupings may be defined based on needs of a working goal (e.g., a project or the like) of the organizational entity. The needs of an accessor group typically drive or dictate the type of personnel, computing devices, and/or tools of the organization that should be combined into a grouping to achieve a working goal. The decisioning of the specific resources that are included in the groupings may be performed manually (e.g., department managers, executive in charge, etc.) or may be performed automatically by a data access resource service or platform.

In the case that the groupings are derived manually, the method 200 may provide an interface that populates all available resources of an organization that can combined into a grouping and an administrator or user responsible for generating the groupings may selectively include any available resource into a grouping.

Additionally, or alternatively, the groupings may be determined automatically by a remote data access control service. In such instance, the data access control service may determine or create groupings based on historical grouping information of the organization entity or input comprising grouping protocols based on suggested guidelines for grouping entity resources. For instance, the data access control service is able to analyze prior or historical working goals data (e.g., prior to implementation of system 100/method 200 and post-implementation data) of the entity and the resources that were used to satisfy the working goal. Thus, based on a comparison of a current working goal that requires a grouping and historical working goals and associated groupings, the data access control service is able to determine a combination of organizational resources that should be grouped for achieving a proposed working goal. The data access control service may be able to generate one or more proposed working groups and populate the proposed workings groups to an interface (e.g., web interface) for selection and/or confirmation by an authorized party.

Additionally, or alternatively, the remote data access control service may function to automatically determine or define groupings using a machine learning model that functions to predict which users of an organization or a computer network that should be grouped together. In some embodiments, the machine learning model may be a machine learning classifier that generates a classification label for each of the users or accessors (e.g., computing devices, applications, etc.) of a computer network of the organization. The remote data access control service may function to define accessor groups of the like by assembling together users and/or accessors having common classification labels. In another embodiment, the machine learning model may function to predict one or more accessor groups, or the like based on receiving machine learning input of user job descriptions, application functionality descriptions, computing device functionality descriptions, and/or the like. In such embodiment, the machine learning model may function to predict or propose working groups comprising users and/or accessors that should be grouped together to achieve some common organizational functionality or common project.

Step S230, which includes applying one or more access control schemes to the one or more data sources of the organizational entity, functions to enable the selective application of a permissioning indicia to the one or more data sources to define a data grouping. The permissioning indicia may be any type or kind of visually perceptible (possibly audibly perceptible) indicator (e.g., color, a virtual object, a virtual marker, shape, etc.) for marking or associating with the one or more virtual representations of the data sources of the organization into a data grouping or data tribe of sorts. Thus, the permissioning indicia may include any metaphorical representation. That is, a same permissioning indicia (e.g., color) may be used to mark each data resource that will be combined into a data grouping. For example, the data resources of an organization may include six databases, which are virtually represented via an interface as database objects 1-6, respectively. In such example, an authorized party may selectively apply a permissioning indicia, such as a specific color, to each database which he desires for defining a data grouping and thus, may apply a color marker, such as a blue color marker, to each of databases 2 and 6 and not the remaining databases. Accordingly, databases 2 and 6 will form a data grouping.

Figure 6:
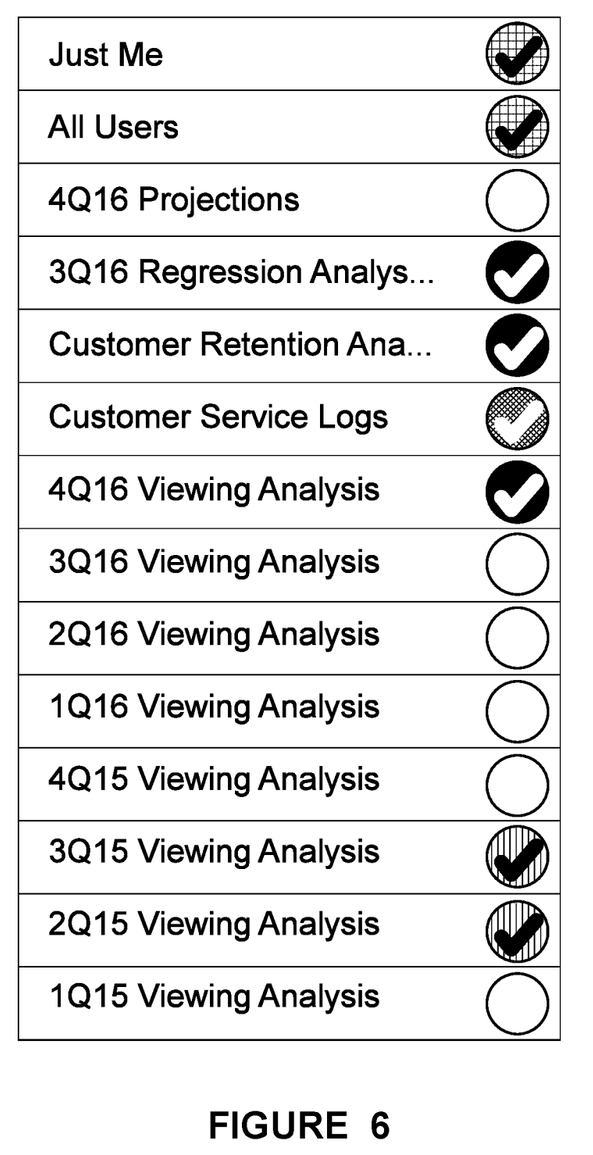
FIG. 6 illustrates another example graphical user interface in accordance with one or more embodiments of the present application.

It shall be noted that the one or more data resources may be marked with any number of permissioning indicia to form various or same data resource groupings. For example, a single database or the like may be marked with a first, second, and third permissioning indicia (e.g., blue, green, and red color indicia) and the single database may form part of three different data resource groupings (e.g., a blue data grouping, a green data grouping, and red data grouping), which may each include varying data sources. Additionally, a user can apply a same color permissioning indicia to many different projects, allowing the permissions applied to one color group and project to all other projects with that same color designation, as shown in FIG. 6.

Additionally, while the application of the permissioning indicia to a particular data resource may typically virtually modify or augment an appearance of the virtual object of the data resource at a display interface, the application of the permissioning indicia may also automatically digitally encode and/or augment the particular data resource with permissioning meta data or permissioning code. The permissioning meta data or code may include a randomly generated identifier or possibly, a predetermined identifier that may be used to link, correlate, and/or associate the particular data resource to another data resource that was previously or subsequently marked with the same permissioning indicia. That is, each data resource that is marked with a same permissioning indicia (e.g., marked with the color blue or the like) is similarly encoded or augmented with permissioning meta data or code. For example, each data resource that has a blue permissioning indicia applied to it a code of 123-blue is then associated with the identifier or digital record of the data resource. In such example, all data resources having the blue permissioning indicia may be digitally linked to each other and any subsequent accessor group provided with the blue permissioning indicia may be capable of accessing all data resources having a same blue permissioning indicia.

In some embodiments, when a permissioning indicia is applied to multiple data resources, a relationship reference table is automatically generated that identifies each of the multiple data resources as being electronically linked or associated with each other, effectively defining a data resource grouping. Accordingly, the relationship reference table may be viewable and preferably, modifiable via the access control interface. That is, an administrator or the like may modify the relationship reference table to add or remove electronic data resources from an associated group of data resources independently of applying or removing permissioning indicia.

By associating each data resource having a same permissioning indicia with each other, allows the data resource grouping to be accessible via a single virtual workspace. In particular, when accessing a virtual workspace for the data resource grouping, a web interface may populate each of the data resources (e.g., virtual object representations) of the data resource grouping into the virtual workspace. For the virtual workspace, users with appropriate permissions to the workspace may access, use, and/or manipulate the data associated with any of the data resources in any manner.

Step S240, which includes defining an assemblage (e.g., task assemblage, project assemblage) based on associating at least one of the accessor groupings with the one or more data sources and/or sources having the access control schemes applied thereto, functions to link, correlate, grant access to, and/or associate accessor groupings with one or more defined data resource groupings. In a preferred embodiment, the assemblage involving the accessor grouping and the data resource grouping is achieved by applying the same permissioning indicia applied to the individual data resources (or a collection of data resources) in a data resource grouping to a defined accessor grouping. For example, if a color access control policy is implemented, the permissioning indicia may be represented by the color green. At a time before creating the assemblage, each of the data resources in the data resource grouping would have been marked with the color green thereby encoding or augmenting to each data resource permissioning meta data or code that creates an associating and/or link among similarly coded data resources. Thus, the same permissioning indicia (e.g., the color green) may be applied against a specific accessor grouping and once applied, creates a permissioning nexus between the accessor grouping and the data resource grouping. As a result, the accessor grouping is granted permissions to access, use, and/or manipulate the data resources within the data resource grouping having a same permissioning indicia. Accordingly, the assemblage (e.g., project) defines a permissioning nexus between an accessor grouping and the data resource grouping of an organizational entity in which the personnel, devices, and/or applications within the accessor grouping have permissions in the data resource grouping.

2.1 Method and System for Native Access Control and Data Management

In a variation of the system 100 and method 200, the system includes components for natively implementing access control and setting access control policy and the method includes steps and processes of the implementation. This implementation may be performed in conjunction with the system 100 and the method 200 or independent therefrom.

In this variation, access control policy setting and the implementation of the access control activities are performed primarily on a user's local computer. That is, a software application may be installed in a user's local computer with additional processes integrating with an entity's underlying file systems, databases, and the like. Thus, rather than using a web browser or interface and many of the processing powers of a remote cloud data access control service for implementing access control, this variation relies mainly on the existing processing capabilities of the computing resources of local user computers and/or of the entity and integrate with the entity's underlying file systems and databases (e.g., original data resources and not replicas).

The native access control and data management component of this variation may act as a gateway or portal for all activities that relate to file systems and/or databases of entity including, for example, opening, modifying, deleting, adding, copying, and moving files and/or databases. In this native access control and data management implementation, the ability of the user to access data resources of the entity, either within a remote database or locally on the user's computer or the like, may be predicated on a continuous or near continuous connection with a remote data access control service or platform. Thus, when data access is provisioned to a user, in some embodiments, it may be required that the user's computing device or otherwise, being used to access the data is in continuous or near continuous connection with the data access control service or platform to thereby maintain the user's ability to access and/or user the data. That is, if the user's computing device is not in communication with the data access control platform, it is possible that the user's access to the permissioned data may be terminated until connectivity is re-established or regained.

Figure 3:
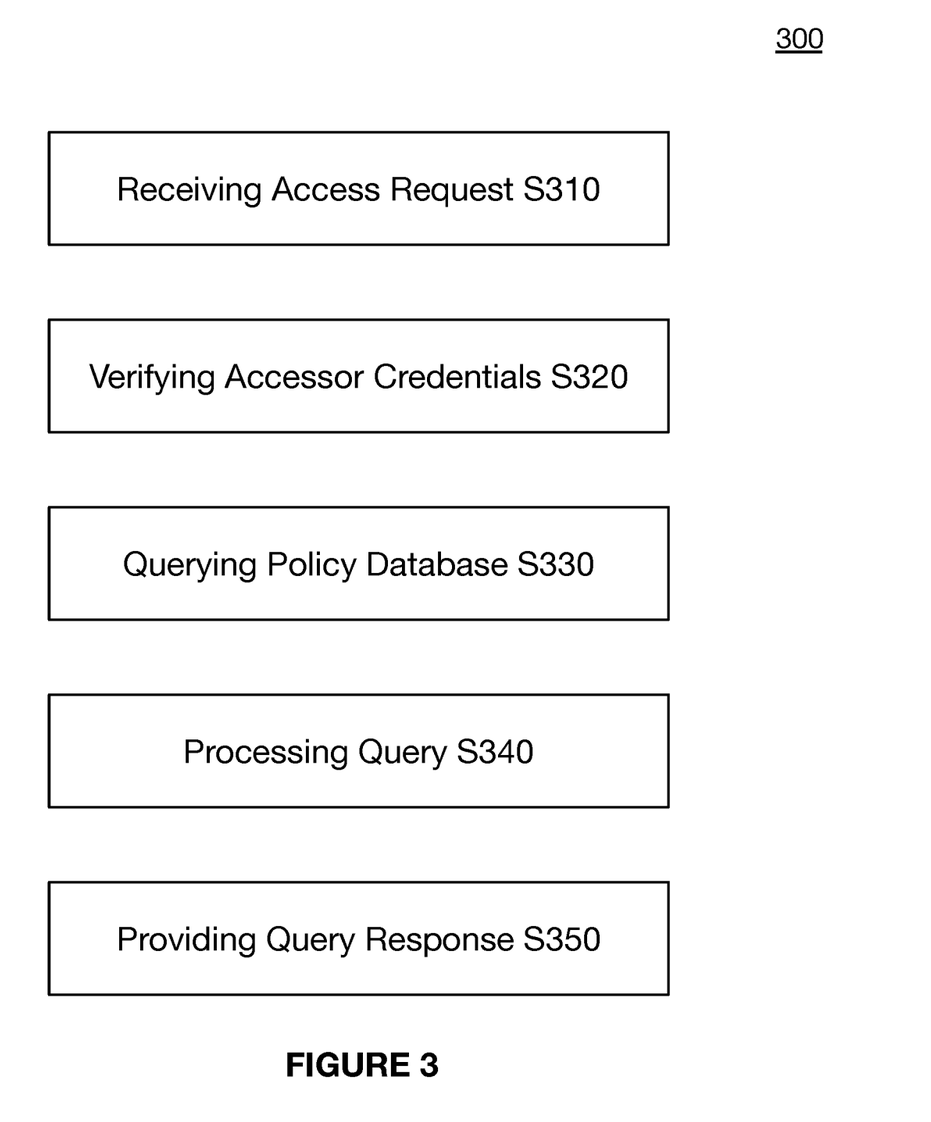
FIG. 3 illustrates a process flow of a variation of a method of a preferred embodiment of the present application.

As shown in FIG. 3, a method 300 for this variation may include, receiving a request to access a data resource S310, verifying and/or authenticating user credentials or computing resource identifiers/credential associated with the request S320, querying a remote access policy service based on the request and/or user or computing resource credentials S330, evaluating the query against an access policy database or server S340, and providing a response to enforce any user actions in accordance with the parameters of an access policy S350.

Additionally, the native access control and data management component may be a governing authority (e.g., governor) that may act as a logging agent for monitoring files and databases users and/or computing resources access. In some embodiments, the governor may be an agent that may be continuously or intermittently in communication with a remote access control service. The logging agent may log activities such as file opening, editing, copying, and email, and the like performed by users and/or computing resources of the entity.

The governor may function to enforce security and access policies that are, preferably, set within a remote data access control service. In this regard, any permissioning defined within the remote data access control platform user interface may be replicated on a user's physical computer or on any physical computing device attempting to access a data resource.

Additionally, in some embodiments, the governor may require constant network access (e.g., via the Internet or local area network) to maintain governing functions over local data resources of the entity. Using the network access, the governor may remain in constant connection or contact with a remote data access control service for the purposes of evaluating whether or not a data resource access event is in line with access control policies set with the remote service. In the circumstance that the connection between the local governor and the remote data access control service is disconnected and/or cannot be maintained, a user and/or computing resource may be prevented from accessing any files under the control of the governor.

Additionally, the governor may include an anomaly detection system that allows the governor to detect and/or determine when a user and/or computing resource is behavior irregularly. In such case, the governor may prevent the irregularly acting user and/or computing resource from accessing files. For example, the governor may lock access to files that appear that they are being misappropriated or prevent malicious software (e.g., Ransomware or the like) from inflicting further damage.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system 100 and one or more portions of processors and/or controllers of system 100. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various permissioning indicia.

As a person skilled in the art will recognize from the previous detailed description and from the figures and claims, modifications and changes can be made to the preferred embodiments of the invention without departing from the scope of this invention defined in the following claims.

What is claimed is:

1. An online method for controlling access to electronic data resources of a computer network, the online method comprising:
   identifying a data ingestion group comprising a plurality of electronic data resources of the computer network;
   ingesting the data ingestion group at a web-based access control service by generating a replica data ingestion group, wherein ingesting the data ingestion group includes replicating each of the plurality of electronic data resources of the computer network to a remote storage of the web-based access control service;
   applying different permissioning indicia to disparate subsets of the electronic data resources of the replica data ingestion group;
   defining one or more accessor groups comprising one or more users of the computer network;
   generating one or more permissioning nexus between each of the one or more accessor groups and one or more of the disparate subsets of the electronic data resources of the replica data ingestion group, wherein generating the one or more permissioning nexus includes applying one of the different permissioning indicia to each of the one or more accessor groups based on updated access control policy associated with the computer network;
   disabling access to the data ingestion group at the computer network based on generating the one or more permissioning nexus; and
   enabling access to the replica data ingestion group at the web-based access control service based on generating the one or more permission nexus.

2. The method of claim 1, wherein:
   the data ingestion group is maintained at one or more storage locations of the computer network, and
   the replica data ingestion group is maintained at the remote storage.

3. The method of claim 2, further comprising:
   in response to disabling access to the data ingestion group at the computer network, automatically routing one or more access requests for the electronic data resources of the data ingestion group to the web-based access control service; and
   allowing or disallowing the one or more access requests for accessing replicas of the electronic data resources by the remote access control service based on the one or more permissioning nexus.

4. The method of claim 1, further comprising:
   selecting an access control scheme comprising a color-coded access control policy,
   wherein the different permission indicia comprises a plurality of different color markers, wherein setting the permissioning nexus between each of the one or more accessor groups and the one or more of the disparate subsets of the electronic data resources of the replica data ingestion group includes assigning a same color marker of the plurality of different color markers that was previously applied to a subset of the replica data ingestion group to a respective accessor group.

5. The method of claim 1, further comprising:
providing a web-based access control interface that enables provisioning the electronic data resources of the replica data ingestion group at the web-based access control service to the defined one or more accessor groups associated with the computer network,
wherein the web-based access control interface displays a population of a plurality of users of the computer network and the disparate subsets of the electronic data resources of the replica data ingestion group.

6. The method of claim 5, further comprising:
generating a virtual representation of each of the electronic data resources of the replica data ingestion group; and
providing the virtual representation of each of the electronic data resources via the web-based access control interface.

7. The method of claim 6, wherein:
applying different permissioning indicia to disparate subsets of the electronic data resources of the replica data ingestion group includes:
providing, via the web-based access control interface, a virtual representation of each of the disparate subsets of the electronic data resources, wherein the virtual representations comprises a plurality of different graphical interface objects;
providing, via the web-based access control interface, a virtual representation of each of the different permissioning indicia; and
enabling an administrator of the web-based access control interface to associate each of the disparate subsets of the electronic data resources with at least one of the different permissioning indicia by selectively moving one or more of the virtual representations of different permissioning indicia to an area of the virtual representations of the disparate subsets of the electronic data resources.

8. The method of claim 1, wherein:
applying different permissioning indicia to disparate subsets of the electronic data resources of the replica data ingestion group modifies an appearance of graphical interface objects corresponding to the disparate subsets of the electronic data resources.

9. The method of claim 1, wherein:
applying different permissioning indicia to disparate subsets of the electronic data resources of the replica data ingestion group automatically encodes the disparate subsets of electronic data resources with permissioning code that electronically links disparate subsets of electronic data resources to other subsets of electronic data resources assigned with a same permissioning indicia.

10. The method of claim 1, further comprising:
during a provisioning period comprising a period defined by the generation of the one or more permissioning nexus, access requests received from users of the computer network are evaluated according to a first access control policy comprising a pre-existing access control policy of the computer network; and
automatically evaluating access requests received from users of the computer network according to the updated access control policy after the provisioning period is complete.

11. An online method for controlling access to computing resources of a computer network, the online method comprising:
identifying a computing resource ingestion group comprising a plurality of computing resources of the computer network;
ingesting the computing resource ingestion group at a remote access control service by generating a replica computing resource ingestion group, wherein ingesting the computing resource ingestion group includes replicating each of the plurality of computing resources of the computer network to a remote storage of the remote access control service;
applying different permissioning indicia to disparate subsets of the plurality of computing resources of the replica computing resource ingestion group;
defining one or more accessor groups comprising one or more users of the computer network;
generating one or more permissioning nexus between each of the one or more accessor groups and one or more of the disparate subsets of the plurality of computing resources of the replica computing resource ingestion group, wherein generating the one or more permissioning nexus includes applying one of the different permissioning indicia to each of the one or more accessor groups based on updated access control policy for the remote access control service;
disabling access to the computing resource ingestion group at the computer network based on generating the one or more permissioning nexus; and
enabling access to the replica computing resource ingestion group at the remote access control service based on generating the one or more permission nexus.

12. The method of claim 11, further comprising:
in response to disabling access to the computing resource ingestion group at the computer network, automatically routing one or more access requests for the computing resources of the computing resources ingestion group to the remote access control service; and
allowing or disallowing the one or more access requests for accessing replicas of the plurality of computing resources by the remote access control service based on the one or more permissioning nexus.

13. The method of claim 11, further comprising:
selecting an access control scheme comprising a color-coded access control policy, wherein the different permission indicia comprises a plurality of different color markers,
wherein setting the permissioning nexus between each of the one or more accessor groups and the one or more of the disparate subsets of the computing resources of the replica data ingestion group includes assigning a same color marker of the plurality of different color markers that was previously applied to a subset of the replica computing resources ingestion group to a respective accessor group.

14. The method of claim 11, further comprising:
providing a web-based access control interface that enables provisioning the computing resources of the replica data ingestion group at the remote access control service to the defined one or more accessor groups associated with the computer network,
wherein the web-based access control interface displays a population of a plurality of users of the computer network and the disparate subsets of the computing resources of the replica data ingestion group.

15. The method of claim 14, further comprising:
generating a virtual representation of each of the computing resources of the replica data ingestion group; and
providing the virtual representation of each of the computing resources via the web-based access control interface.

16. The method of claim 15, wherein:
applying different permissioning indicia to disparate subsets of the computing resources of the replica data ingestion group includes:
- providing, via the web-based access control interface, a virtual representation of each of the disparate subsets of the computing resources, wherein the virtual representations comprises a plurality of different graphical interface objects;
- providing, via the web-based access control interface, a virtual representation of each of the different permissioning indicia;
- enabling an administrator of the web-based access control interface to associate each of the disparate subsets of the computing resources with at least one of the different permissioning indicia by selectively moving one or more of the virtual representations of different permissioning indicia to an area of the virtual representations of the disparate subsets of the computing resources.

* * * * *